United States Patent
Erickson

(10) Patent No.: US 7,089,838 B2
(45) Date of Patent: Aug. 15, 2006

(54) ZERO CENTERLINE TOOLHOLDER ASSEMBLY

(75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 17 days.

(21) Appl. No.: 10/766,396

(22) Filed: Jan. 28, 2004

(65) Prior Publication Data

US 2005/0160887 A1    Jul. 28, 2005

(51) Int. Cl.
B23B 31/16    (2006.01)

(52) U.S. Cl. .......................................... 82/158; 82/137

(58) Field of Classification Search ................. 82/158, 82/159, 121, 137; B23B 31/16
See application file for complete search history.

(56) References Cited

U.S. PATENT DOCUMENTS

| | | | | |
|---|---|---|---|---|
| 1,067,104 | A * | 7/1913 | Fitzpatrick | 29/10 |
| 2,330,156 | A * | 9/1943 | Stoen | 470/80 |
| 3,733,925 | A * | 5/1973 | Schmidt et al. | 82/139 |
| 3,754,487 | A * | 8/1973 | Nachtigal | 82/1.11 |
| 4,062,255 | A * | 12/1977 | Perotti et al. | 82/170 |
| 4,450,737 | A * | 5/1984 | Hitt | 82/137 |
| 4,864,904 | A * | 9/1989 | Mishiro | 82/137 |
| 4,940,369 | A * | 7/1990 | Aebi et al. | 407/42 |
| 5,452,631 | A * | 9/1995 | Erickson | 82/160 |
| 5,738,027 | A * | 4/1998 | White | 112/80.55 |
| 6,415,696 | B1 | 7/2002 | Erickson et al. | |
| 6,453,782 | B1 * | 9/2002 | Yamazaki et al. | 82/118 |
| 6,676,008 | B1 * | 1/2004 | Trapp et al. | 228/112.1 |
| 6,708,382 | B1 * | 3/2004 | Yamazaki et al. | 29/27 C |
| 6,813,980 | B1 * | 11/2004 | Inayama | 82/120 |
| 6,865,789 | B1 * | 3/2005 | Katoh et al. | 29/40 |
| 2002/0113436 | A1 * | 8/2002 | Verdillon | 285/333 |
| 2004/0003690 | A1 * | 1/2004 | Katoh et al. | 82/121 |
| 2004/0081520 | A1 * | 4/2004 | Ishii et al. | 407/54 |

FOREIGN PATENT DOCUMENTS

JP     2000133436 A  *  5/2000

OTHER PUBLICATIONS

Berter, Goran, Presentation, "Multi-Task Machining," Sandvik Tooling, Sandvik AB, Sandviken, Sweden, 10 pages, presentation held Oct. 19, 2004.
Catalogue Page, "Turning Tools," Kennametal No. 1096907, © 1996-2004 Kennametal Inc., One page.

* cited by examiner

Primary Examiner—Monica Carter
Assistant Examiner—Sara Addisu
(74) Attorney, Agent, or Firm—Larry R. Meenan

(57) ABSTRACT

A zero centerline toolholder assembly includes a cutting insert mounted to a toolholder. The center, RC, of the nose radius of the cutting insert is aligned with or lies on a centerline, LT, of the toolholder. The centerline, LT, of the toolholder may be also aligned with a rotational axis, $CT_2$, of a tool spindle. The tool spindle is tilted at an angle with respect to an axis, P, that is substantially perpendicular to a longitudinal axis, LW, of a work piece. As a result of the zero centerline configuration, the radial component of the torque load on the toolholder is virtually eliminated. In addition, the toolholder assembly has a shorter tool length, thereby reducing deflection load on the toolholder.

17 Claims, 2 Drawing Sheets

ZERO CENTERLINE TOOLHOLDER ASSEMBLY

BACKGROUND OF THE INVENTION

1. Field of the Invention

The invention is directed to tooling for machining operations and, more particularly, directed to zero centerline toolholder assembly that is substantially aligned at a non-perpendicular angle with respect to a longitudinal axis of the work piece during machining operations.

2. Description of the Related Art

Toolholder assemblies, such as milling and turning cutters, that perform machining operations on work pieces, are well known in the art. Typically, the toolholder assembly includes one or more cutting inserts that are mounted around the outer periphery of the cutter body for producing a series of metal-shaving cuts on a work piece.

Referring now to FIG. 2, a conventional toolholder assembly 100 includes a cutting tool 102, such as a cutting insert, is held by a toolholder 104. The toolholder 104 can be releasable secured within a tool spindle 106 by a shank 116 that is rotated by a spindle motor (not shown). The tool spindle 106 can be of a quick change type as described in U.S. Pat. No. 6,415,696, the entire contents of which is incorporated herein by reference. For example, a spindle clamping unit (not shown) may be used to releasably secure the shank 116 of the toolholder 104 to the tool spindle 106.

The toolholder 104 may have a support portion 112 with a pocket 114 for receiving the cutting insert 102 therein. The cutting insert 102 may be retained in the pocket 114 by a means well-known in the art, such as a clamp, or the like. As seen in FIG. 2, a central, longitudinal axis, LC, or centerline of the cutting insert 102 (and support portion 112) forms a non-zero angle, α, which respect to the central, longitudinal axis, LT, or centerline of the toolholder 104. The toolholder 104 may also includes a body portion 118 that extends from a tool rest 110 when the toolholder 104 is installed in the tool rest 110.

For CNC machining operations, the tool spindle 106 may be free to fix and hold the toolholder 104 and other tools in a predetermined holding state, and is free to rotate, drive and position around a rotational axis (axial center), $CT_2$. When the toolholder 104 is installed in the tool rest 110, a central, longitudinal axis, LT, or centerline of the toolholder 104 corresponds to the rotational axis, CT2, of the tool rest 110. In addition, the tip of the cutting insert 102 that engages the work piece, 102 extends from the tool spindle 106 by a tool length, L, of approximately 5.9 inches (150 mm).

During machining operations, a work piece 102 is generally held by a chuck 122 with chuck jaws 124 for rotation in the direction, W, in a manner known in the art. When the work piece 102 is installed in the chuck jaws 124, the work piece 122 has a longitudinal axis, LW, along its centerline that is perpendicular to the longitudinal axis, LT, or centerline of the toolholder 104. It should also be noted that the direction of cut, as shown by the arrow, is along the Z-axis and is parallel to the longitudinal axis, LW, or centerline of the work piece 122 and perpendicular to the longitudinal axis, LT, or centerline of the toolholder 104. In addition, it should be noted that the centerline, LT, of the toolholder 104 and the rotational axis, $CT_2$, of the tool rest 110 corresponds to the axis, P, perpendicular to the centerline, LW, of the work piece 102.

The inventors of the present invention have determined that the main component of cutting force is a tangential force that acts in a direction perpendicular to the top of the cutting insert 102. The next highest component of the cutting force is a feed force, which is generally about one-half (½) of the tangential force. The feed force usually acts in a direction opposite of the direction of cut (i.e., parallel to the Z-axis or centerline, LW, of the work piece 102 in FIG. 2). The next highest component of the cutting force is a radial force, which is generally about one-quarter (¼) of the tangential force, and acts in a direction perpendicular to the tangent point at which a nose radius 102a of the cutting insert 102 contacts the work piece 122. In FIG. 2, the radial force is along the same direction as the tool length, L, and toward the spindle housing 108. Therefore, the tangential load has the highest effect on the torque loading of the joint between the toolholder 104 and the tool spindle 106. A torque loading is developed by the tangential load and the radial offset of this load (i.e, the radial distance from the nose radius 102a of the cutting insert 102 to the centerline, LT, of the tool), and is perpendicular to tool length, L. In FIG. 2, the combination of the feed and radial forces provides an undesirable force component of about 26.6 degrees, for example, in the cutting plane that tends to try to pull the toolholder 104 out of the clamping unit of the tool spindle 106. In addition, the forces exerted on the toolholder 104 may cause a deflection of the toolholder 104 that is directly proportional to the tool length, L. Unfortunately, any error associated with the mounting connection between the toolholder 104 and the tool spindle 106 or deflection of the toolholder 104 can cause errors in the alignment of the cutting insert 102 with the work piece 102.

Thus, there is a need to provide a cutting tool orientation that minimizes or eliminates the torque on the cutting tool during machining operations, as well as reducing or eliminating the radial error associated with the connection of the toolholder with the toolholder spindle.

SUMMARY OF THE INVENTION

To solve these and other problems associated with conventional toolholder assemblies, the inventor of the present invention has developed a zero centerline toolholder assembly in which the radial component of the torque loading on the connection between the toolholder and the tool spindle is eliminated by aligning the nose radius of the cutting insert with the centerline of the toolholder. Specifically, the toolholder assembly comprises a toolholder having a centerline, LT, and a cutting insert having a nose radius with a center, RC, when mounted to the toolholder. The center, RC, of the nose radius of the cutting insert lies along or is aligned with the centerline, LT, of the toolholder. The centerline, LT, of the toolholder is aligned at a non-zero angle with respect to an axis, P, that is substantially perpendicular to a longitudinal axis, LW, of a work piece.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
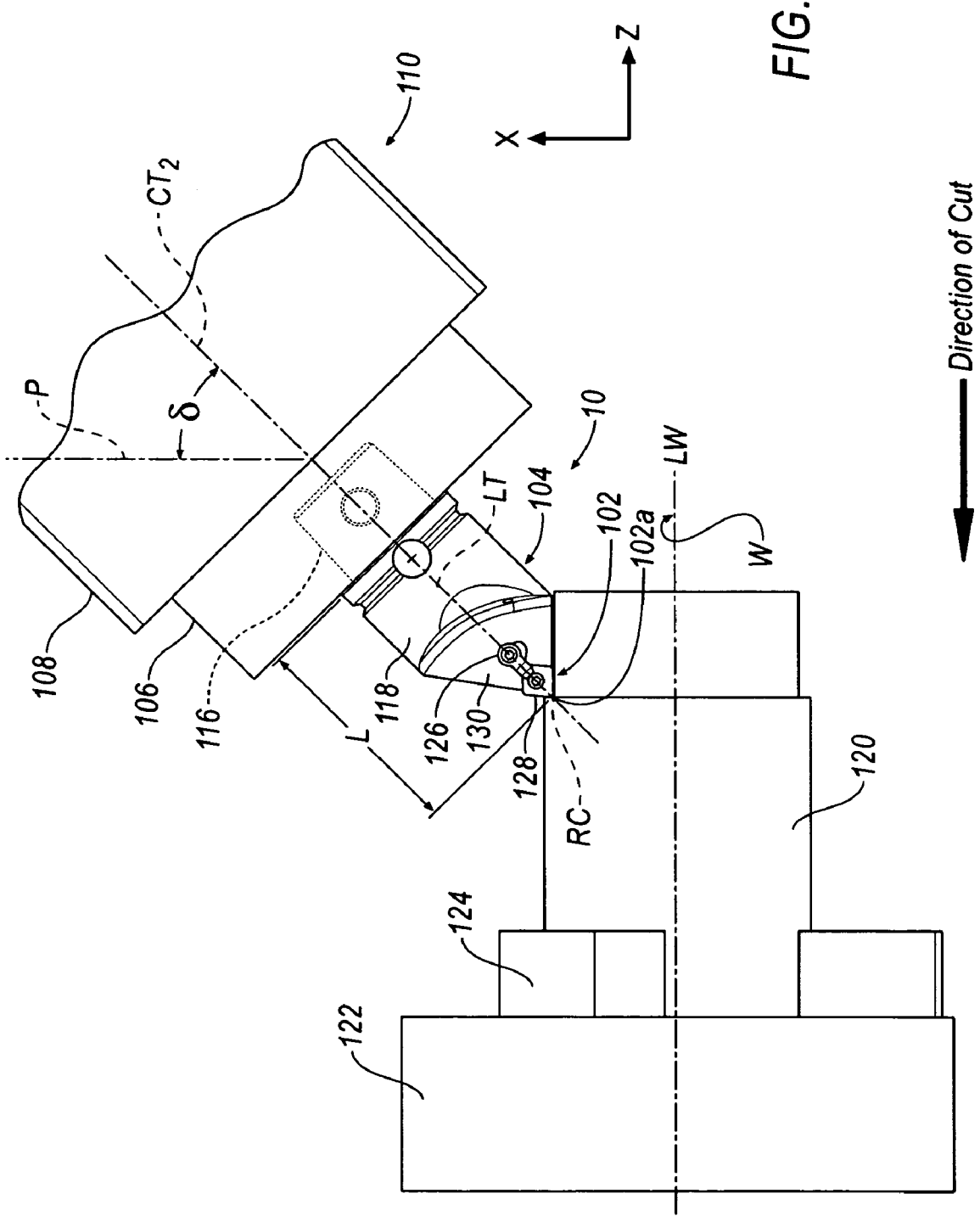
FIG. 1 shows a top plan view of a zero centerline toolholder assembly according to an embodiment of the invention.

Referring now to FIG. 1, a toolholder assembly 10 is shown according to an embodiment of the invention. The toolholder assembly 10 includes a cutting tool 102, such as the cutting insert, that is held by a toolholder 104. The toolholder 104 is mounted within the tool spindle 106. The tool spindle 106 is secured to and rotated by a spindle motor (not shown) within a spindle housing 108 of a tool rest 110. The toolholder 104 may have a support portion 130 with a pocket 128 for receiving the cutting insert 102 therein. The cutting insert 102 may be retained in the pocket 128 by a means well known in the art, such as a clamping mechanism 126, or the like.

As seen in FIG. 1, a central, longitudinal axis, LT, or centerline passes through the center, RC, thereby forming the zero centerline toolholder assembly 10 of the invention. In other words, the center, RC, of the nose radius 102a of the cutting insert 102 lies on the centerline, LT, of the toolholder 104 to form the zero centerline configuration of the toolholder assembly 10 of the invention.

The zero centerline configuration of the toolholder assembly 10 of the invention is accomplished by tilting the tool spindle 106 and the spindle housing 108 at a fixed, non-zero angle, δ, with respect to the axis, P, depending on the tool configuration and the geometry of the cutting insert 102. That is, the zero centerline configuration of the toolholder assembly 10 is accomplished by tilting the tool spindle 106 and the spindle housing 108 at a fixed, non-perpendicular angle, δ, with respect to the longitudinal axis, LW, of the workpiece 120. Further, the rotational axis, $CT_2$, of the tool rest 110 may be aligned with the center, RC, of the nose radius 102a of the cutting insert 102 and the centerline, LT, of the toolholder 104. By contrast, the center, RC, of the nose radius 102a of the cutting insert 102 of the conventional toolholder 100 does not lie on the centerline, LT, of the toolholder 104. Further, the centerline, LT, of the toolholder 104 is parallel to (i.e, lies on) the axis, P. As a result of the zero centerline configuration of the toolholder assembly 10 of the invention, and the angle, δ, at which the toolholder 104 and cutting insert 102 is configured with the respect to the axis, P the torque on the toolholder assembly 10 and the deflection of the cutting insert 102 during machining operations is greatly reduced or virtually eliminated.

Figure 2:
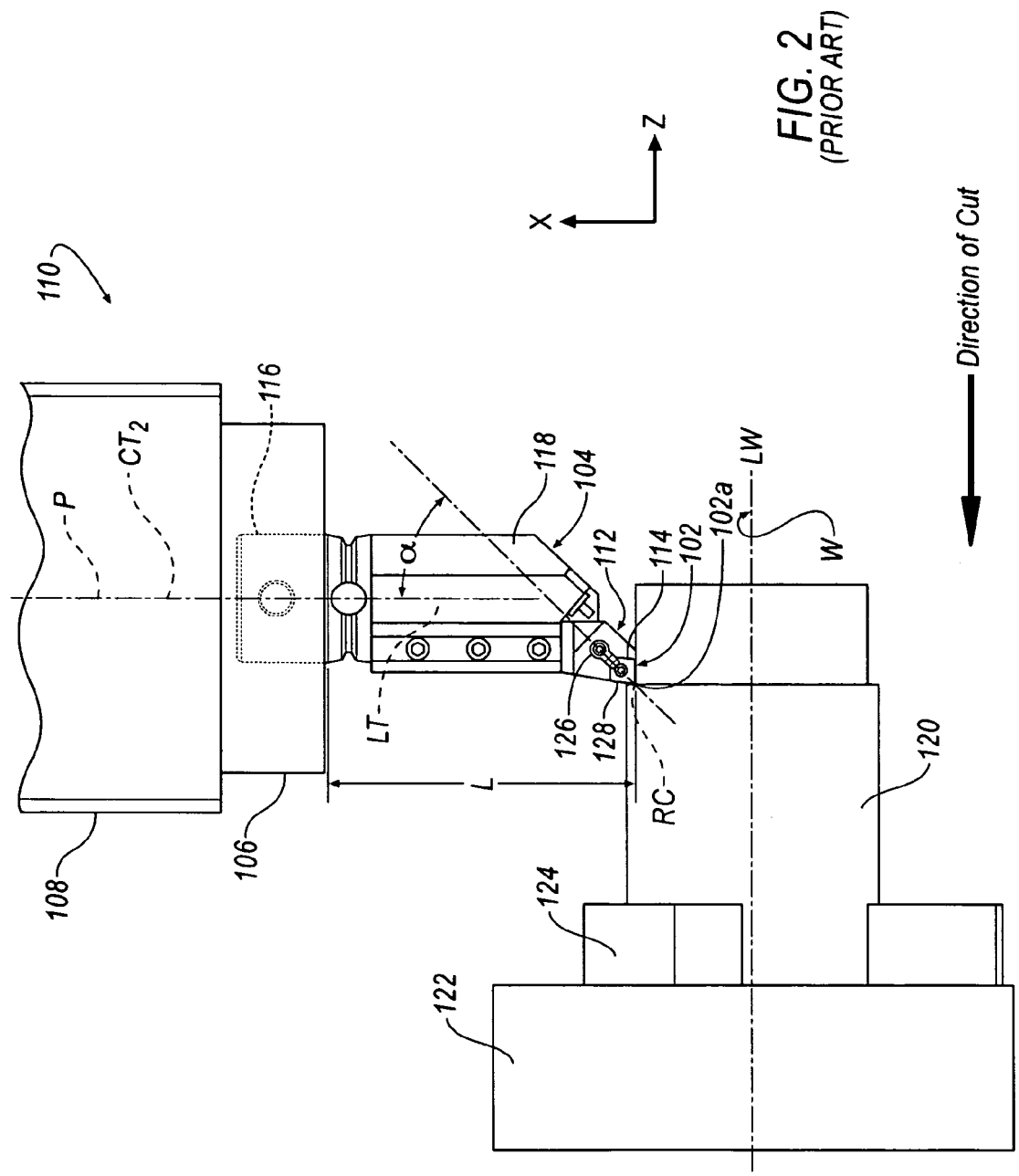
FIG. 2 shows a top plan view of a conventional toolholder assembly in which a centerline of the cutting insert defines a non-zero angle with respect to a centerline of the toolholder.

In addition, the centerline, LT, of the toolholder 104, forms an angle, δ, of between about 25.0 degrees and about 45.0 degrees with respect to an axis, P, that is substantially perpendicular to the centerline, LW, of the work piece 102, as compared to the conventional toolholder assembly 100 shown in FIG. 2 that forms the angle, δ, equal to zero with respect to the axis, P.

As mentioned above, the combination of the feed and radial forces of the conventional tool assembly 100 shown in FIG. 2 provides a resultant force component in the cutting plane that tends to try to pull the toolholder 104 out of the clamping unit of the tool spindle 106. However, in the toolholder assembly 10 of the invention shown in FIG. 1, much more of this combination, or resultant force, will be directed back into the spindle joint, thus minimizing the tendency to pull the toolholder 104 out of the clamping unit of the tool spindle 106. For example, in FIG. 2, the resultant force component is acting in a direction of about 63.4 degrees, away from the direction of cut from the centerline, LT and originating at the nose radius center, RC, of the toolholder 104.

By contrast, in the toolholder assembly 10 of the invention shown in FIG. 1, with the tool spindle 106 tilted at an angle, δ, of about 45.0 degrees, for example, with respect to the axis, P, (and also to the longitudinal axis, LW, of the work piece 102) the resultant force component is acting in a direction of about 18.4 degrees (45.0 degrees minus 26.6 degrees), away from the direction of cut from the centerline, LT, and originating at the nose radius center, RC, of the toolholder 104. In addition, when the toolholder 104 is installed in the tool rest 110, a central, longitudinal axis, LT, or centerline of the toolholder 104 is substantially aligned with the rotational axis, $CT_2$, of the tool rest 110.

As mentioned above, the tool length, L, of the conventional toolholder assembly 100 shown in FIG. 2 is approximately 5.9 inches (150 mm). In many cases, this distance is necessary to allow the spindle housing 108 to clear the work holding device (i.e., the chuck 122 and chuck jaws 124). By inclining or tilting the toolholder spindle 106 at 45.0 degrees, for example, with respect to the axis, P, (and also the longitudinal axis, LW, of the workpiece 120), the tool length, L, can be shortened and still allow clearance for the spindle housing 108 with the work holding device. For example, the tool length, L, of the toolholder 10 of the invention is in a range of approximately 3.15 inches (80 mm) to approximately 4.72 inches (120 mm), and preferably in a range of approximately 3.54 inches (90 mm) to approximately 4.33 inches (110 mm), and most preferably approximately 3.94 inches (100 mm), as compared to approximately 5.91 inches (150 mm) in the conventional toolholder 100. These dimensions refer to a commonly used tooling system size with an outside diameter of 2.480 inches (63 mm). Smaller or larger tooling system sizes would require smaller or larger dimensions, respectively. Because the clamping mechanism of the spindle that holds the toolholder assembly 10 has a substantially constant clamping force, a shorter tool length, L, will yield less deflection under load and provide better cutting performance.

In the illustrated embodiment of the invention shown in FIG. 1, the toolholder assembly 10 is depicted as a left-handed configuration tool because the toolholder assembly 10 is tilted at an angle, δ, with respect to the axis, P, such that the nose radius 102a of the cutting insert 102 is toward the direction of cut (indicated by the arrow). Thus, it is important that the cutting insert 102 has the appropriate rakes and geometry required for left hand tool. It can be appreciated that the same design concepts can be applied to a right hand tool which would be designed to cut in the opposite direction of the tool illustrated in FIG. 1. Accordingly, the appropriate insert rakes and geometry must be utilized to suit the cutting action of right hand tool.

In the illustrated embodiment of the invention, the cutting insert 102 has a diamond-shape configuration and is mounted in the insert pocket 128 such that the cutting insert 102 is mirror symmetric about the centerline, LT, of the toolholder 104. However, it will also be appreciated that the principles of the invention can be practiced with any desirable cutting insert configuration, and not just a diamond-shaped configuration of the cutting insert 102. For example, the cutting insert 102 may have a triangular-shape configuration and mounted in the insert pocket 128 such that the cutting insert 102 is not symmetric about the centerline, LT, of the toolholder 104, while still maintaining the zero centerline configuration of the toolholder assembly 10 of the invention in which the center, RC, of the nose radius 102a of the cutting insert 102 lies on the centerline, LT, of the toolholder 104.

As described above, the toolholder assembly 10 of the invention provides a zero centerline toolholder configuration in which the center, RC, of the nose radius 102a of the cutting insert 102 and the centerline, LT, of the toolholder 104 are aligned with each other (i.e., the center, RC, lies on the centerline, LT). In addition, the center, RC, and the centerline, LT, are also aligned with the rotational axis, $CT_2$, of the tool rest 110. The centerline, LT, of the toolholder 104 form a fixed non-zero angle, δ, with respect the axis, P, which is substantially perpendicular to the centerline, LW, of the work piece 102. By locating the center, RC, of the nose radius 102a of the cutting insert 102 on the centerline, LT, of the toolholder 104, the radial component of the torque load is eliminated and torque loading of the joint between the toolholder 104 and the tool spindle 106 is minimized. In addition, the zero centerline configuration ensures that the nose radius 102a of the cutting insert 102 is properly located in the cutting plane and maintains proper alignment with the centerline, LT, of the toolholder 104 during machining operations. Further, the shorter tool length, L, of the toolholder assembly 10 of the invention reduces deflection of the toolholder 104 during machining operations. Still further, the direction of the cutting forces in the zero centerline configuration of the toolholder assembly 10 of the invention ensures that the joint or connection between the toolholder 104 and the tool spindle 106 is kept together.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A zero centerline toolholder assembly, comprising:
   a toolholder having a centerline, LT; and
   a cutting insert having a nose radius with a center, RC, the cutting insert mounted to said toolholder,
   wherein said center, RC, of the nose radius of said cutting insert is aligned with the centerline, LT, of said toolholder, and
   wherein said centerline, LT, of said toolholder is aligned at a single, fixed, non-zero angle, δ, with respect to an axis, P, that is substantially perpendicular to a longitudinal axis, LW, of a work piece based on a geometry of the cutting insert for the duration of a machining operation.

2. The toolholder assembly of claim 1, wherein said non-zero angle is between about twenty-five degrees and about forty-five degrees.

3. The toolholder assembly of claim 1, wherein said toolholder assembly has a tool length of approximately 80 to 120 mm.

4. The toolholder assembly of claim 1, wherein said centerline, LT, of said toolholder is substantially aligned with a rotational axis, $CT_2$, of said toolholder assembly.

5. A zero centerline toolholder assembly, comprising:
   a tool spindle rotatably mounted to a spindle housing of a tool rest;
   a toolholder mounted within said tool spindle, said toolholder having a centerline, LT; and
   a cutting insert having a nose radius wit a center, RC, the cutting insert mounted in an insert pocket of said toolholder,
   wherein said center, RC, of the nose radius of said cutting insert lies on said centerline, LT, of said toolholder, and
   wherein said centerline, LT, of said toolholder is aligned at a single, fixed, non-zero angle, δ, with respect to an axis, P, that is substantially perpendicular to a longitudinal axis, LW, of a work piece based on a geometry of the cutting insert for the duration of a machining operation.

6. The cutting tool of claim 5, wherein said non-zero angle is between about twenty-five degrees and about forty-five degrees.

7. The cutting tool of claim 5, wherein said toolholder assembly has a tool length of approximately 80 to 120 mm.

8. The toolholder assembly of claim 5, wherein said centerline, LT, of said toolholder is substantially aligned with a rotational axis, $CT_2$, of said toolholder assembly.

9. The toolholder assembly of claim 5, wherein said centerline, LT, of said toolholder is aligned in a direction away from a direction of cutting of said work piece.

10. A meted of forming a zero centerline toolholder assembly, comprising:
    aligning a center, RC, of a nose radius of a cutting insert wit a centerline, LT, of a toolholder; and
    aligning the centerline, LT, of the toolholder at a single, fixed, non-zero angle, δ, with respect to an axis, P, that is substantially perpendicular to a longitudinal axis, LW, of a work piece based on a geometry of the cutting insert for the duration of a machining operation.

11. The method of claim 10, wherein said non-zero angle is between about twenty-five degrees and about forty-five degrees.

12. The method of claim 10, wherein said toolholder assembly has a tool length of approximately 80 to 120 mm.

13. The method of claim 10, further including the step of aligning said centerline, LT, of said toolholder with a rotational axis, $CT_2$, of said toolholder assembly.

14. The method of claim 10, further comprising the step of mounting said toolholder within a tool spindle.

15. The method of claim 14, further comprising the step of rotatably mounting said tool spindle to a spindle housing of a tool rest.

16. The toolholder assembly of claim 1, wherein said centerline, LT, of said toolholder is aligned in a direction away from a direction of cutting of said work piece.

17. The method of claim 10, wherein said centerline, LT, of said toolholder is aligned in a direction away from a direction of cutting of said workpiece.

* * * * *